US 11,262,762 B2

(12) United States Patent
Han et al.

(10) Patent No.: US 11,262,762 B2
(45) Date of Patent: Mar. 1, 2022

(54) NON-SOLID OBJECT MONITORING

(71) Applicant: Apple Inc., Cupertino, CA (US)

(72) Inventors: Byron B. Han, Cupertino, CA (US);
Young Woo Seo, Cupertino, CA (US);
Kit-Man Wan, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 425 days.

(21) Appl. No.: 15/762,531

(22) PCT Filed: Sep. 22, 2016

(86) PCT No.: PCT/US2016/053179
§ 371 (c)(1),
(2) Date: Mar. 22, 2018

(87) PCT Pub. No.: WO2017/053615
PCT Pub. Date: Mar. 30, 2017

(65) Prior Publication Data
US 2019/0072969 A1  Mar. 7, 2019

Related U.S. Application Data

(60) Provisional application No. 62/232,807, filed on Sep. 25, 2015.

(51) Int. Cl.
*G05D 1/02* (2020.01)
*G01C 21/26* (2006.01)
(Continued)

(52) U.S. Cl.
CPC ....... *G05D 1/0214* (2013.01); *B60W 30/0956* (2013.01); *B60W 30/10* (2013.01);
(Continued)

(58) Field of Classification Search
CPC .. G05D 1/0214; G05D 1/0238; G05D 1/0088; B60W 30/0956; G01C 21/3407; G01C 21/3461; G08G 1/165
(Continued)

(56) References Cited

U.S. PATENT DOCUMENTS 6,744,382 B1   6/2004  Lapis et al.
8,842,182 B2   9/2014  Mimeault et al.
(Continued)

FOREIGN PATENT DOCUMENTS

CN        1243995        2/2000
CN      101389976 A      3/2009
(Continued)

OTHER PUBLICATIONS

C. Armbrust, et al., "RAVON: The robust autonomous vehicle for off-road navigation", In Using Robots in Hazardous Environments, Jan. 1, 2011, Pages.
(Continued)

*Primary Examiner* — Isaac G Smith
(74) *Attorney, Agent, or Firm* — Robert C. Kowert; Kowert, Hood, Munyon, Rankin & Goetzel, P.C.

(57) ABSTRACT

An autonomous navigation system may autonomously navigate a vehicle through an environment in which one or more non-solid objects, including gaseous and/or liquid objects, are located. Sensors, including sensors which can detect chemical substances in a region of the environment, may detect non-solid objects independently of an opacity of the objects. Non-solid objects may be determined to present an obstacle or interference based on determined chemical composition, size, position, velocity, concentration, etc. of the objects. The vehicle may be autonomously navigated to avoid non-solid objects based on positions, trajectories, etc. of the non-solid objects. The vehicle may be navigated
(Continued)

according to avoidance driving parameters to avoid non-solid objects, and a navigation system may characterize a non-solid object as a solid object having dimensions and position which encompasses the non-solid object, so that the vehicle is navigated in avoidance of non-solid objects as if the non-solid objects were solid.

20 Claims, 7 Drawing Sheets

(51) Int. Cl.
    *B60W 30/095*     (2012.01)
    *B60W 30/10*     (2006.01)
    *G01C 21/34*     (2006.01)
    *G05D 1/00*     (2006.01)
    *G08G 1/16*     (2006.01)

(52) U.S. Cl.
    CPC ......... *G01C 21/26* (2013.01); *G01C 21/3407* (2013.01); *G01C 21/3461* (2013.01); *G05D 1/0088* (2013.01); *G05D 1/0238* (2013.01); *G05D 1/0242* (2013.01); *G08G 1/165* (2013.01); *B60W 2552/35* (2020.02); *G05D 2201/0213* (2013.01)

(58) Field of Classification Search
    USPC .......................................................... 701/23
    See application file for complete search history.

(56) References Cited

U.S. PATENT DOCUMENTS

| | | | |
|---|---|---|---|
| 8,971,578 B2 | 3/2015 | Sekiguchi et al. | |
| 9,097,800 B1* | 8/2015 | Zhu | G01S 7/4802 |
| 9,132,913 B1* | 9/2015 | Shapiro | G08G 5/0086 |
| 2006/0244830 A1 | 11/2006 | Davenport et al. | |
| 2009/0216444 A1 | 8/2009 | Crowell | |
| 2010/0106356 A1* | 4/2010 | Trepagnier | G08G 1/16 701/25 |
| 2010/0145659 A1* | 6/2010 | Busch | G01J 3/28 702/190 |
| 2011/0121979 A1* | 5/2011 | Blackburn | G01N 23/221 340/600 |
| 2012/0191350 A1* | 7/2012 | Prata | G01S 19/53 702/3 |
| 2014/0044312 A1* | 2/2014 | Ehlgen | G01N 21/538 382/104 |
| 2014/0200801 A1* | 7/2014 | Tsuruta | B60W 30/10 701/400 |
| 2014/0324266 A1 | 10/2014 | Zhu et al. | |
| 2014/0343761 A1 | 11/2014 | Pastor | |
| 2015/0166072 A1 | 6/2015 | Powers et al. | |
| 2015/0168556 A1* | 6/2015 | Zhu | G01S 17/06 701/28 |
| 2016/0280160 A1* | 9/2016 | MacNeille | G05B 15/02 |

FOREIGN PATENT DOCUMENTS

| | | |
|---|---|---|
| CN | 101484346 | 7/2009 |
| CN | 102227612 | 10/2011 |
| CN | 102959599 A | 3/2013 |
| CN | 103359119 A | 10/2013 |
| CN | 103946732 | 7/2014 |
| JP | 2010257307 | 11/2010 |
| JP | 2010257307 A * | 11/2010 |
| WO | 2013049248 | 4/2013 |

OTHER PUBLICATIONS

Office Action from Chinese Application No. 201680050017.5, dated Sep. 27, 2020. (English translation and Chinese version), pp. 1-27.
Office Action dated Jul. 5, 2021 in Chinese patent application No. 201680050017.5, Apple Inc. (pp. 1-30 including translation).
Office action and Search Report from Chinese Application No. 201680050017.5, (English Translation and Chinese Version), dated Dec. 2, 2021, pp. 1-23.

* cited by examiner

NON-SOLID OBJECT MONITORING

This application is a 371 of PCT Application No. PCT/US2016/053179, filed Sep. 22, 2016, which claims benefit of priority to U.S. Provisional Patent Application No. 62/232,807, filed Sep. 25, 2015. The above applications are incorporated herein by reference. To the extent that any material in the incorporated application conflicts with material expressly set forth herein, the material expressly set forth herein controls.

BACKGROUND

Technical Field

This disclosure relates generally to autonomous navigation of a vehicle, and in particular to an autonomous navigation system which can be included in a vehicle and which navigates the vehicle in an environment with respect to a non-solid object which is located in the environment, based on monitoring and characterizing the non-solid object.

Description of the Related Art

The rise of interest in autonomous navigation of vehicles, has resulted in a desire to develop autonomous navigation systems which can autonomously navigate (i.e., autonomously "drive") a vehicle through various routes, including one or more roads in a road network, such as contemporary roads, streets, highways, etc., one or more instances of airspace, waterways, etc.

In some cases, autonomous navigation is enabled via an autonomous navigation system (ANS) which can process and respond to detection of various elements in an external environment, including static features (e.g., roadway lanes, road signs, etc.) and dynamic features (present locations of other vehicles in a roadway on which the route extends, present locations of pedestrians, present environmental conditions, roadway obstructions, etc.) along a route in real-time as they are encountered, thereby replicating the real-time processing and driving capabilities of a human being.

In some cases, autonomous navigation includes navigating a vehicle in response to detection of one or more objects located in the environment through which the vehicle is being navigated. For example, where another vehicle is detected ahead of the navigated vehicle and is determined to be moving slower than the navigated vehicle, such that the navigated vehicle is approaching the other vehicle, the navigated vehicle can be slowed or stopped. In another example, where a pedestrian is identified near an edge of the roadway along which the vehicle is being navigated, the vehicle can be slowed or stopped in response to detection of the pedestrian.

In some cases, sensors, which can also be referred to herein interchangeably as sensing apparatuses, included in a vehicle are structured to detect and characterize solid objects in the external environment. For example, a vehicle can include one or more radars, ultrasonic sensors, light beam scanning devices, visible light camera devices, infrared camera devices, near-infrared camera devices, depth camera devices which can include one or more light-scanning devices, including LIDAR devices, etc. and an ANS which detects and characterizes objects in the environment based on reflection of radar waves, ultrasonic waves, light beams, etc. from solid surfaces of the objects in the environment.

SUMMARY OF EMBODIMENTS

Some embodiments provide an autonomous navigation system which can be installed in a vehicle and autonomously navigate the vehicle through an environment in which the vehicle is located. The autonomous navigation system detects a non-solid object in the environment, based on processing sensor data generated by one or more sensors configured to monitor one or more features of the non-solid object, independently of a visual opacity of the non-solid object. The autonomous navigation system, based on detecting the non-solid object in the environment, navigates the vehicle along a driving route which avoids intersecting the non-solid object.

Some embodiments provide a method which includes performing, by one or more computer systems, autonomously navigating a vehicle through an environment in which the vehicle is located. The autonomously navigating includes detecting a non-solid object in the environment, based on processing sensor data generated by one or more sensors configured to monitor one or more features of the non-solid object, independently of a visual opacity of the non-solid object; determining whether the non-solid object presents as a potential obstacle or potential interference to the vehicle; and navigating the vehicle along a driving route which avoids intersecting the non-solid object, based on detecting the non-solid object in the environment.

Some embodiments provide a non-transitory, computer-readable medium storing a program of instructions which, when executed by at least one computer system, cause the at least one computer system to autonomously navigate a vehicle through an environment in which the vehicle is located. The autonomously navigating includes detecting a non-solid object in the environment, based on processing sensor data generated by one or more sensors configured to monitor one or more features of the non-solid object, independently of a visual opacity of the non-solid object; and navigating the vehicle along a driving route which avoids intersecting the non-solid object, based on detecting the non-solid object in the environment.

Figure 1:
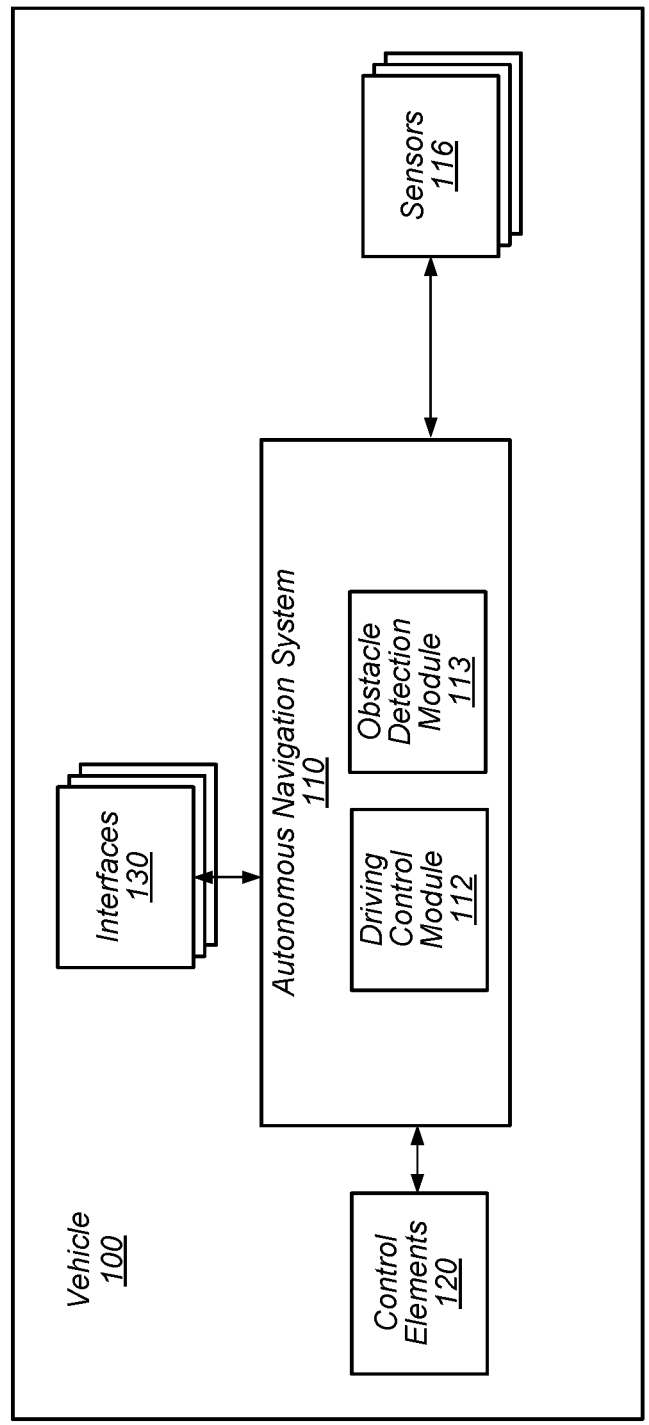
FIG. 1 illustrates a schematic block diagram of a vehicle which comprises an autonomous navigation system (ANS), according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

FIG. 1 illustrates a schematic block diagram of a vehicle 100 which comprises an autonomous navigation system (ANS), according to some embodiments. Some or all of the ANS 110 illustrated in FIG. 1, including one or more of the modules 112, 113, etc., can be included in any of the embodiments of ANSs included in any of the embodiments herein.

Vehicle 100 includes an autonomous navigation system ("ANS") 110, a set of one or more sensors 116, a set of one or more control elements 120, and a set of one or more user interfaces 130. As referred to herein, vehicle 100 can include one or more various embodiments of vehicles, including one or more of a land vehicle (e.g., an automobile, truck, etc.), aircraft, watercraft, etc. Sensors 116 include devices which monitor one or more aspects of an external environment in which the vehicle is located. Monitoring an aspect of an external environment can include generating, at the sensor, sensor data which includes information regarding the aspect of the external environment. Sensor data generated by a sensor can include a sensor data representation of one or more portions of an environment, including a sensor data representation of one or more objects located within the environment. A sensor 116 can include one or more of a camera device which generates images of one or more portions of the external environment, a light beam scanning device which generates one or more point clouds of one or more portions of the external environments, a radar which generates radar data associated with one or more portions of the external environment, etc. Objects included in an external environment which can be monitored include one or more static elements, dynamic elements, etc. included in the environment. For example, a sensor 116 which includes a camera device can capture images of an external environment which includes images of static elements, including roadway lane boundary markers, roadway curbs, inanimate obstacles in the roadway, etc., images of dynamic elements including traffic participants, fauna, ambient environment conditions, weather, etc.

In some embodiments, one or more of the sensors 116 included in vehicle 100 include one or more chemical agent sensors, which can include one or more stand-off chemical agent detector devices, which are configured to detect and characterize one or more various chemical substances which are located in a portion of the external environment which is physically separate from a portion of the environment in which the vehicle 100 is located. A chemical agent sensor can include a spectroscopy device which is configured to detect one or more chemical substances in an environment based on spectroscopic analysis of the environment. A chemical agent sensor can include a device which is configured to detect one or more chemical substances in an environment based at least in part upon monitoring a refraction of light passing through the environment, a coloration of a portion of the environment, an opacity of a portion of the environment, some combination thereof, etc.

The control elements 120 included in vehicle 100 include various control elements, including actuators, motors, etc. which each control one or more components of the vehicle which cause the vehicle to be navigated through an external environment. For example, a control element 120 can include one or more of a braking assembly (also referred to herein interchangeably as a braking system) which applies braking pressure to one or more wheel assemblies of the vehicle to cause the vehicle to be decelerated, a throttle assembly which adjusts the acceleration of the vehicle 100 through an external environment, a steering assembly which adjusts one or more configurations of one or more wheel assemblies which causes the vehicle to be adjustably navigated in one or more various directions through the external environment, etc. A control element can execute one or more various adjustments to navigation of the vehicle based on receipt and execution of one or more various control commands at the control elements from one or more of a user interface 130, the ANS 110, etc.

The one or more user interfaces 130, also referred to herein interchangeably as input interfaces, can include one or more driving control interfaces with which an occupant of the vehicle 100 can interact, such that the driving control interfaces generate control commands which cause one or more control elements 120 to adjustably navigate the vehicle 100, based on one or more occupant interactions with one or more interfaces 140. In some embodiments, one or more input interfaces 140 included in the vehicle 100 provide one or more instances of information to occupants of the vehicle, including indications of whether the vehicle is being navigated via autonomous driving control of the vehicle 100 by ANS 110, indications of non-solid objects in the environment through which the vehicle is being navigated, indications that the vehicle is being navigated according to one or more driving parameters to avoid a non-solid object, indications that the vehicle is being navigated to avoid a non-solid object, etc.

In some embodiments, one or more instances of personal data can be accessed by ANS 110. For example, in some embodiments, ANS 110 can process sensor data, generated by one or more sensors 116, and, based on personal data including facial recognition data, associated user device detection, etc., identify a dynamic element in the environment as an element associated with a particular individual, user account, etc.

Users can selectively block use of, or access to, personal data. A system incorporating some or all of the technologies described herein can include hardware and/or software that prevents or blocks access to such personal data. For example, the system can allow users to "opt in" or "opt out" of participation in the collection of personal data or portions of portions thereof. Also, users can select not to provide location information, or permit provision of general location information (e.g., a geographic region or zone), but not precise location information.

Entities responsible for the collection, analysis, disclosure, transfer, storage, or other use of such personal data should comply with established privacy policies and/or practices. Such entities should safeguard and secure access to such personal data and ensure that others with access to the personal data also comply. Such entities should implement privacy policies and practices that meet or exceed industry or governmental requirements for maintaining the privacy and security of personal data. For example, an entity should collect users' personal data for legitimate and reasonable uses, and not share or sell the data outside of those legitimate uses. Such collection should occur only after receiving the users' informed consent. Furthermore, third parties can evaluate these entities to certify their adherence to established privacy policies and practices.

ANS 110 includes various modules 112, 113 which can be implemented by one or more computer systems. ANS 110 autonomously navigates vehicle 100 along one or more driving routes, based at least in part upon sensor data generated by one or more sensors 116.

Driving control module 112 can determine a driving route based at least in part upon at least some sensor data generated by one or more sensors 116, including position data indicating a geographic position of the vehicle 100 and a world model, stored in one or more memory storage devices included in the vehicle 100, one or more remotely-located systems external to the vehicle 100, etc.

In some embodiments, the ANS 110 determines a driving route based at least in part upon occupant interaction with one or more interfaces 130 included in the vehicle 100, including one or more interactions which result in the ANS 110 receiving an occupant-initiated command to navigate the vehicle 100 from a particular location in the external environment, which can include a present location of the vehicle 100 in the external environment, to a particular destination location. In some embodiments, the occupant-initiated command includes a command to navigate the vehicle 100 along a particular occupant-selected driving route. In some embodiments, the ANS 110 receives a driving route from a remotely-located system via one or more communication networks.

In some embodiments, a world model via which the driving control module 112 causes the vehicle 100 to be navigated includes one or more objects which represent certain non-solid objects detected in the environment. The module 112 can navigate the vehicle 100 along a driving route which avoids the one or more objects represented in the world model as if the objects were solid objects in the environment. As a result, the module 112 can navigate the vehicle to avoid the non-solid objects in the environment. The objects can be associated with a proximity region, wherein the module 112 is configured to navigate the vehicle 100 according to a set of driving parameters, based on the vehicle 100 being determined to be located within such a proximity region.

In some embodiments, the module 112 generates one or more sets of control element commands which are communicated to one or more control elements 120 in the vehicle 100 and cause the control elements 120 to navigate the vehicle 100 along a driving route. The module 112 can generate control commands based on a driving route, where the control commands, when executed by the control elements 120, cause the vehicle 100 to be navigated along the driving route.

ANS 110 includes an obstacle detection module 113. The module 113, in some embodiments, determines a presence of one or more non-solid objects in an external environment, based on processing data received from one or more sources. The one or more sources can include one or more sensors 116, one or more communication interfaces 130, some combination thereof, etc. Determining a presence of a non-solid object in the environment can include determining a volume of space, also referred to as a region, of the environment which encompasses the non-solid object. In some embodiments, determining a presence of a non-solid object in the environment is based on processing data from multiple data sources, including multiple sensors 116. Determining a presence of a non-solid object can include determining a material composition of at least a portion of the non-solid object, determining whether a heat source is present in proximity with the non-solid object, etc. and determining whether the non-solid object presents as an obstacle or interference. Determining whether a non-solid object presents as an obstacle or interference may be based on comparing one or more determined aspects of the non-solid object, including size, density, position, velocity, material composition, etc. with one or more predetermined indicators of an object being an obstacle or interference.

Module 113 can, based on determining a presence of a non-solid object, determining that the object is an obstacle or interference, etc., communicate information associated with the non-solid objects to various data recipients located internal and external to the vehicle 100. For example, information associated with the non-solid object, including proximity to the object, composition, whether the object is an obstacle or interference, etc. can be communicated to an occupant of the vehicle 100 via one or more user interfaces 130 included in the vehicle 100. In another example, information associated with the non-solid object can be communicated to one or more remote systems, services, including one or more other vehicles, via one or more communication networks.

Module 113 can generate a virtual representation, also referred to herein as a characterization, of the non-solid object, based on the various determined aspects of the non-solid objects, and the characterization can be incorporated into a world model of the environment through which the vehicle 100 is being navigated by ANS 110, so that the ANS 110 can navigate the vehicle 100 with regard to the non-solid object. The characterization can comprise a characterized object, having a position and volume in the world model of the environment which encompasses the position and volume of the non-solid object in the actual environment, and can further include a predicted trajectory, growth rate, etc. of the non-solid object, so that the ANS 110 can navigate the vehicle 100 based on predicted growth and trajectories of the non-solid object. In some embodiments, including based on a determination that the non-solid object is an obstacle or interference, the characterization is incorporated into the world model, also referred to herein as a virtual representation of the environment, as a characterization of a solid object in the environment, so that the ANS 110 can navigate the vehicle 100 to avoid intersecting the non-solid object as if the non-solid object were a solid object.

Figure 2A:
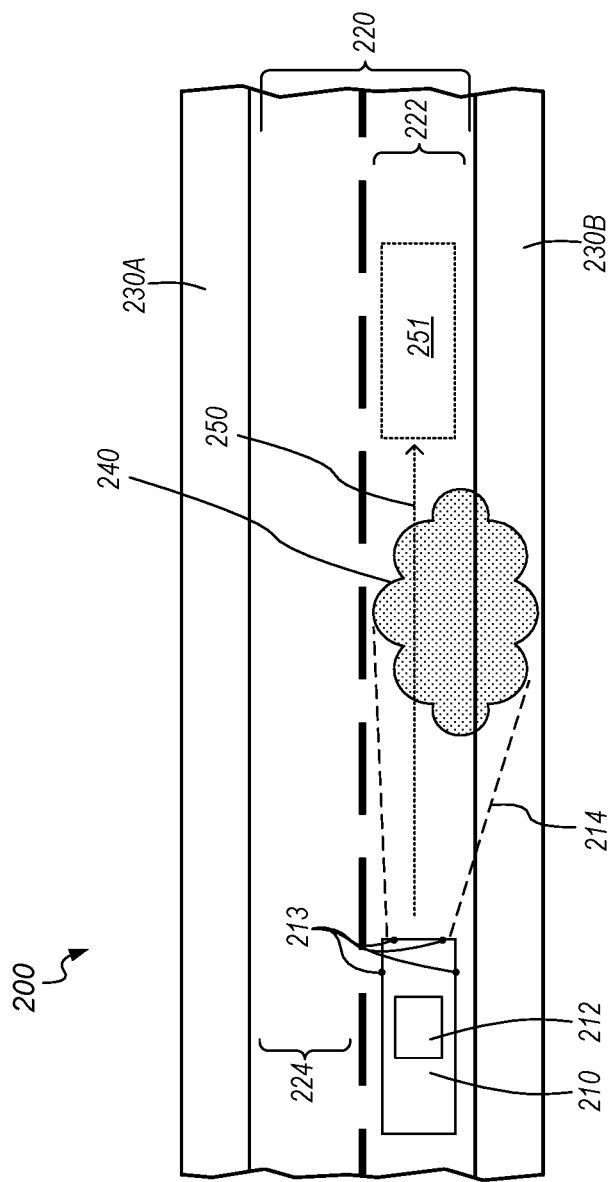
FIG. 2A illustrates an overhead view of an environment in which a vehicle being navigated along a driving route, based on control of the vehicle by an onboard ANS, monitors a non-solid object which is at least partially located on a portion of the driving route, according to some embodiments.

FIG. 2A illustrates an overhead view of an environment in which a vehicle being navigated along a driving route, based on control of the vehicle by an onboard ANS, monitors a non-solid object which is at least partially located on a portion of the driving route, according to some embodiments. Vehicle 210 can include any of the embodiments of vehicles included herein, and ANS 212 can include any of the embodiments of ANSs included herein.

As shown, vehicle 210 is navigating along an existing driving route 250, based on control commands generated by the ANS 212, so that the vehicle 210 moves along roadway 220 in lane 222 and, at a future point in time, arrives at position 251. The vehicle 210 includes a set of sensors 213 which can monitor at least a portion 214 of the environment 200 in which the vehicle 210 is located, including portions 230A-B of the environment which are beyond one or more edges of the roadway 220. The ANS 212 can navigate the vehicle 210 based on sensor data representations of the environment 200, generated as a result of the sensors 213 monitoring 214 the environment.

As further shown, a non-solid object 240 is located in the environment 200. The non-solid object can comprise one or more volumes of non-solid material, including one or more clouds, or other bodies of fog, smoke, exhaust, mist, vapor, fluid, liquid, gas, etc. The illustrated non-solid object 240, which can be, for example, a cloud comprised of one or more substances, is at least partially located within lane 222 and at least partially located in a region 230B external to the roadway.

The vehicle 210 can include one or more sensors 213 which are configured to detect one or more features of the non-solid object, including non-transparent objects which are at least partially transparent. For example, some non-solid objects include one or more clouds of gaseous substances which lack opacity at visible light wavelengths, and thus detection based on opacity alone may be restricted. One or more sensors can include one or more sensors configured to monitor for objects at non-visible EM wavelengths, including infrared, near-infrared, ultraviolet, etc. One or more sensors can include one or more spectroscopic sensors configured to detect the presence of one or more substances in one or more particular regions of the environment based on generating, analyzing, etc. a spectroscopic sensor data representation of the one or more particular regions.

In some embodiments, sensor data generated by a visible light sensor can be analyzed to detect a non-opaque non-solid object. For example, a sensor 213 can detect a non-solid object based on detecting refraction, coloration, some combination thereof, etc. of light passing through the non-solid object.

Based on sensor data generated by one or more sensors 213, the ANS 212 can determine the presences of object 240 in the environment 200. The ANS 212 can determine a particular region of the environment 200 in which the object 240 is located. As shown, the ANS 212 can determine, based on processing sensor data from the sensors 213 which are monitoring 214 the object 240, that the object is encompassing a region which encompasses at least part of roadway lane 222. In some embodiments, the ANS 212 can determine a predicted trajectory, growth rate, etc. based at least in part upon sensor data, including weather data, which can be received from a remote source via a communication network.

As shown, the ANS 212 can determine that the present driving route 250 intersects the non-solid object 240, such that navigating the vehicle 210 along the route 250 will result in the vehicle 210 passing through the object 240. In some embodiments, the ANS 212 determines whether to continue navigating the vehicle 210 along the present route 250 based on analyzing and characterizing the non-solid object. For example, the ANS 212 can determine, based on sensor data, whether the non-solid object 240 is an obstacle or interference. A non-solid object that presents as an obstacle or interference may include an object determined to potentially interfere with one or more of the operation of the vehicle, the health of occupants of the vehicle, some combination thereof, etc. In some embodiments, the ANS 212 can adjust the vehicle configuration, so that substances included in the object 240 are at least partially prevented from entering an interior of the vehicle 210, and can then continue along the present route 250 which intersects the non-solid object 240. For example, where the object 240 is determined to be a small, isolated cloud of smoke, with no proximate infrared signature indicative of a fire, the ANS 212 may decide to continue navigating vehicle 210 along route 250 and through the cloud 240, although the ANS 212 may adjust climate control device configurations, windows, vents, etc. to seal the vehicle interior from smoke entering the interior while the vehicle 210 passes through the cloud.

Where the ANS 212 determines that the object 240 is too large, dense, etc. to navigate through without at least a certain threshold probability of interference with vehicle operation, occupant health, etc. the ANS 212 can navigate the vehicle 210 along a new driving route which avoids intersection with the object.

Figure 2B:
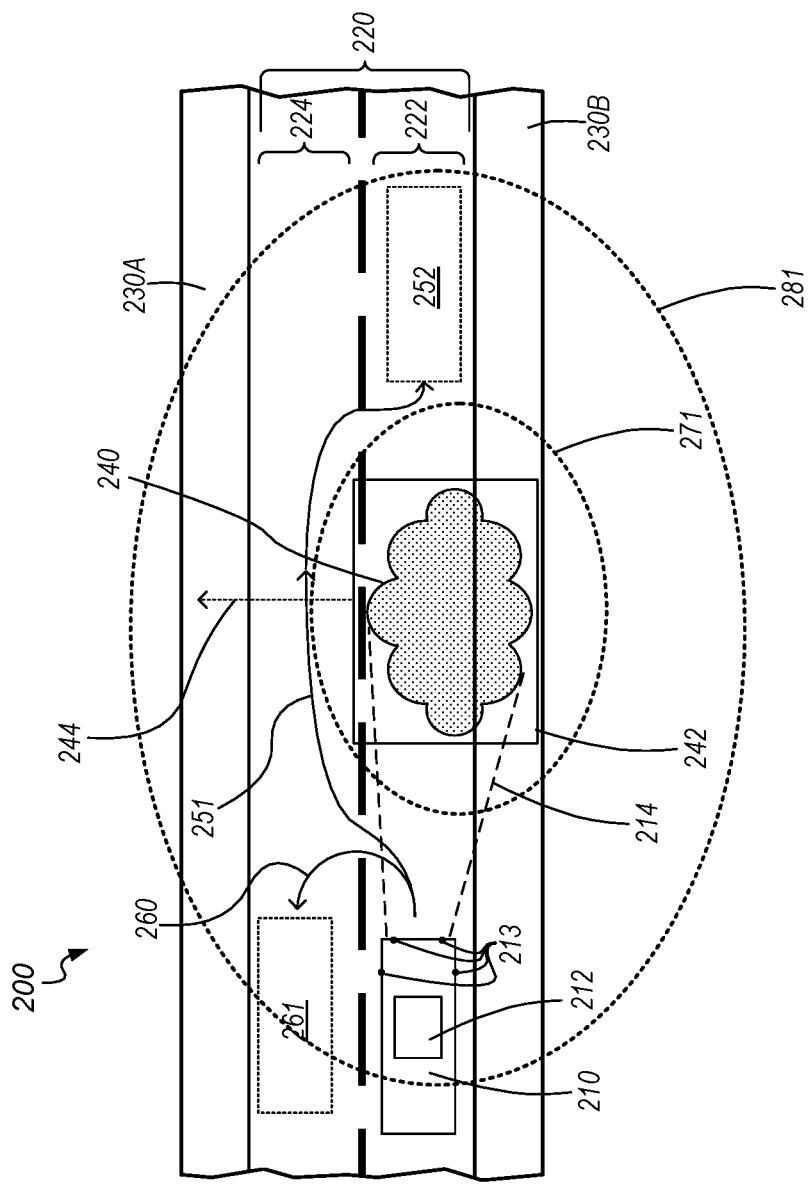
FIG. 2B illustrates an overhead view of an environment in which a vehicle being navigated along a driving route, based on control of the vehicle by an onboard ANS, is navigated by the ANS along a driving route which avoids intersection with the non-solid object, according to some embodiments.

FIG. 2B illustrates an overhead view of an environment in which a vehicle being navigated along a driving route, based on control of the vehicle by an onboard ANS, is navigated by the ANS along a driving route which avoids intersection with the non-solid object, according to some embodiments. Vehicle 210 can include any of the embodiments of vehicles included herein, and ANS 212 can include any of the embodiments of ANSs included herein.

As shown, the ANS 212 can, based on determining that the object 240 presents an obstacle or interference, generate a virtual characterization 242 of the non-solid object which is incorporated into a virtual characterization, or world model, of the environment 200. The characterization can comprise an object, included in the world model, which encompasses a position and volume in the world model which corresponds to a position and volume of the non-solid object 240 in the environment 200. As a result, the ANS 212, which can navigate the vehicle 210 through an environment 200 based on objects characterized in a world model of the environment, can generate control commands which navigate the vehicle 210 with respect to the non-solid object based on the presence of the characterization 242 of the object 240 in a world model of the environment 200.

Because the ANS 212 can characterize the non-solid object with a solid object characterization 242 in the world model, the ANS 212 can navigate the vehicle 210 around the non-solid object 240 as if the non-solid object 240 were a solid object having the position and dimensions of the characterization 242. In one example, shown in FIG. 2B, the ANS 212 navigates the vehicle 210 along a new driving route 251 which avoids the characterization 242 by temporarily switching lanes 222-224 to navigate, in a similar net trajectory as the present driving route 250, which avoids intersecting the non-solid object 240 characterization 242.

In some embodiments, based on a determination that the non-solid object is an obstacle or interference, the ANS 212 can navigate the vehicle 210 according to a set of driving parameters, e.g., specific for object avoidance situations. These parameters can differ from standard driving parameters based on one or more of: navigating the vehicle in violation of one or more rules of the road, including driving in an opposite direction of the correct flow of traffic in a given roadway lane, accelerating at a rate which is greater than a certain threshold associated with normal driving, travelling at a speed which exceeds a local speed limit, navigating off of a recognized roadway, etc. For example, in the illustrated embodiment, the ANS 212 may, based on determining that object 240 is an obstacle or interference, navigate vehicle 210 along a driving route 251 which results in the vehicle 210 navigating, temporarily, in lane 224 which travelling in an opposite direction relative to the direction of travel associated with lane 224.

Driving parameters can be associated with a proximity to a non-solid object, so that the driving parameters are engaged, such that the vehicle is navigated according to same, based on the vehicle being presently located within a certain proximity of a non-solid object. Similarly, the driving parameters can be disengaged, such that the vehicle is navigated according to standard driving parameters, based on the vehicle being located beyond a certain proximity distance of a non-solid object, outside a proximity region associated with the non-solid object, etc. As a result, the vehicle 210, when too close to a non-solid object, may be navigated in an style which prioritizes avoiding the object over comfort, convenience, or standard rules of the road, and can re-set to a standard driving style once the vehicle is sufficiently distant from the object to be considered to be out of the way of interference by the object.

In some embodiments, the ANS 212 can predict a trajectory, growth rate, some combination thereof, etc. of a non-solid object. Based on the predicted trajectory, growth rate, etc., the ANS 212 may determine that continued navigation along a roadway cannot be continued and may execute a detouring driving route. For example, as shown, where ANS 212 determines that the non-solid object 240 is moving along a predicted trajectory 244, such that navigating along roadway 220 will result in the vehicle 210 intersecting the object 240, the ANS 212 can navigate vehicle 210 along a detouring driving route 260 which avoids the non-solid object and puts the vehicle 210 in a position 261 to navigate along a detour route which avoids the non-solid object. In some embodiments, the ANS 212, to navigate the vehicle 210 along a detouring route, can navigate the vehicle 210 to a stop on lane 222, a roadside region 230B, etc. to "wait" for the non-solid object 240 to pass. Where the object 240 is determined to be an obstacle or interference, the ANS 212 may navigate the vehicle 210 along route 260 so that the vehicle 210 is travelling away from the object 240 to reach a certain distance from the object 240. Such a determination of whether to stop or navigate away from the object 240 can be based a position of the vehicle relative to a proximity region associated with a non-solid object within which specific driving parameters are engaged. A given proximity region can be associated with a non-solid object based on one or more determined features of the object, including one or more particular materials, substances, etc. comprising the object, local environmental conditions, including weather conditions, wind speeds, etc., a determination that the object is isolated or being generated by a proximate source, a growth rate of the object, some combination thereof, or the like, and the ANS 212 can navigate the vehicle 210 to avoid entering the proximity distance.

For example, object 240 can be associated with a small proximity region 271, such that ANS 212 may determine that vehicle 210 is outside the proximity region 271 can simply stop the vehicle 210 on roadway 220 to wait for the object 240 to move along trajectory 244. In another example, object 240 can be associated with a larger proximity region 281, for example based on a determination that the object 240 is comprised of a particular substance, such that ANS 212 can determine that the vehicle 210 is already within the proximity region 281 and can, in response, navigate the vehicle along route 261, according to avoidance driving parameters, so that the vehicle 210 leaves the proximity region 281. A characterization 242 of the object 240, generated at the vehicle 210, can be communicated to one or more remotely-located systems, services, vehicles, etc. via one or more communication networks, where the remotely-located system, services, vehicles, etc. can utilize the characterization to enable vehicles to navigate in avoidance of the object without approaching within sensor monitoring 214 range, provide notices of the object 240 to emergency services, etc.

Figure 3:
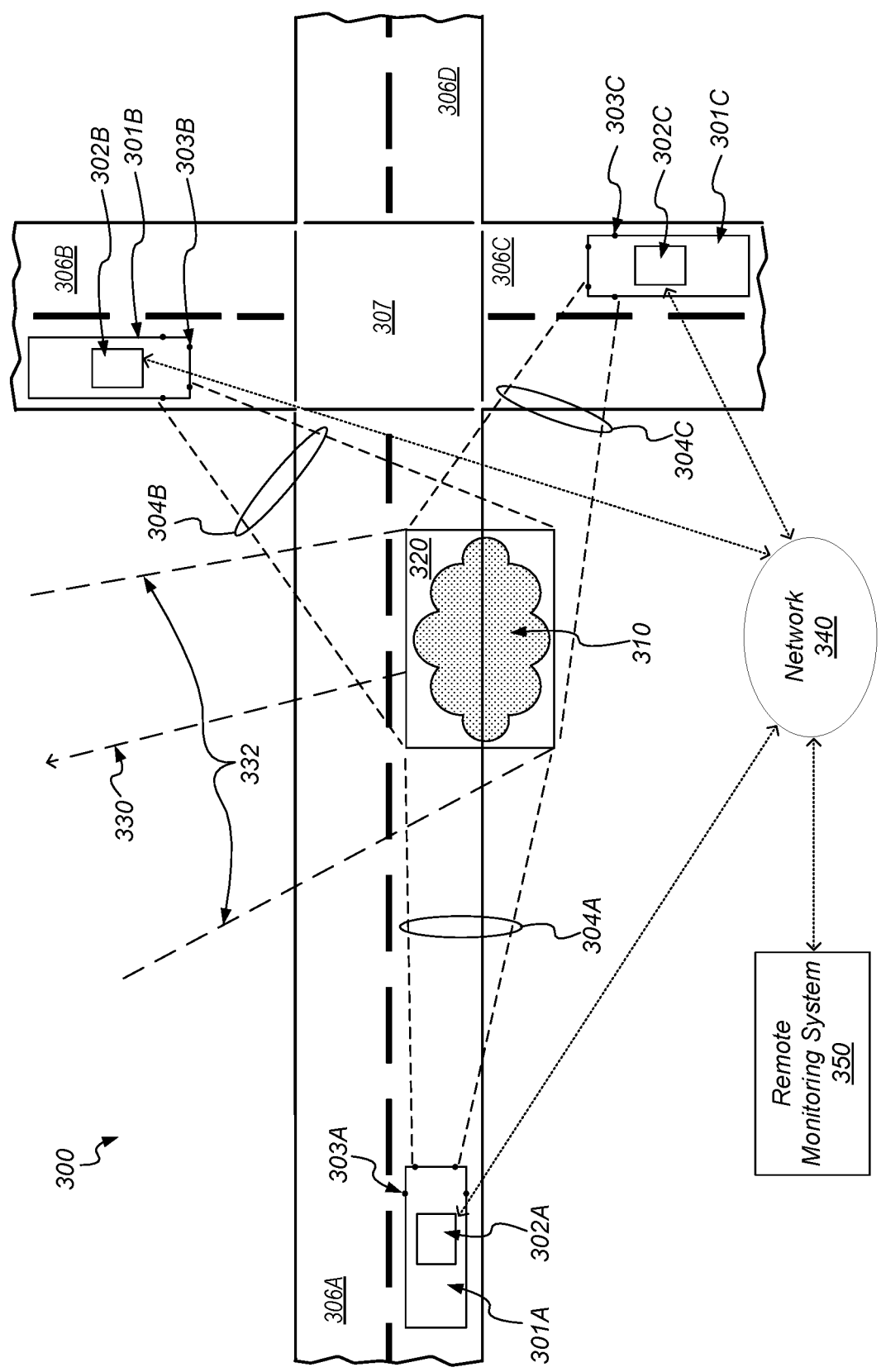
FIG. 3 illustrates an overhead view of an environment in which multiple vehicles and a non-solid object are located, according to some embodiments.

FIG. 3 illustrates an overhead view of an environment in which multiple vehicles and a non-solid object are located, according to some embodiments. Vehicles 301A-C can include any of the embodiments of vehicles included herein, and ANS 302A-C can include any of the embodiments of ANSs included herein.

In some embodiments, a non-solid object located in an environment can be monitored by multiple vehicles located in an environment. Characterizations of the non-solid object generated as a result of the multiple vehicles monitoring the non-solid object can be utilized to achieve an improved accuracy and precision of a characterization of the size, shape, trajectory, etc. of the non-solid object. In some embodiments, the sensor data generated by separate vehicles can be communicated to a remote monitoring system which can process the combined sets of sensor data to generate a virtual representation of the non-solid object and communicate data associated with the representation to various vehicles, where the vehicles can utilize the communicated data to navigate through the environment. In some embodiments, separate vehicles can generate separate characterizations of the non-solid object in the environment, and the separate characterizations can be processed by a remote monitoring system to generate an augmented characterization of the non-solid object based on processing the multiple separate characterizations in combination. In some embodiments, one or more vehicles which monitors a non-solid object in the environment can communicate information associated with the non-solid object, including a virtual representation of the non-solid object, to one or more other vehicles located in the environment.

In the illustrated embodiment shown in FIG. 3, an environment 300 includes multiple roadways 306A-D which intersect at a roadway intersection 307, where vehicle 301A is navigating along roadway 306A and approaching the intersection 307, vehicle 301B is navigating along roadway 306B and approaching the intersection 307, and vehicle 301C is navigating along roadway 306C and approaching the intersection 307. Each vehicle 301A-C includes a separate ANS 302A-C and set of sensors 303A-C via which the respective vehicle 301 can monitor the environment 303 and navigate the respective vehicle 301 along a respective driving route.

As shown, a non-solid object 310 is located in the environment 300. As further shown, each of the vehicles 301A-C is separately monitoring 304A-C the non-solid object 310 via one or more particular sensors 303A-C included in the respective vehicles 301. In some embodiments, each vehicle 301 generates a separate characterization of the non-solid object based on the respective monitoring 304 of the object 310 by the respective sensors 303 included in the respective vehicles 301. Such separate characterizations can include generating a virtual solid object characterization 320 of the object 310 in a characterization of the environment 300, determining a predicted trajectory 330 of the object 320 through the environment, determining a predicted growth 332 of the object 320 as the object 320 moves along the trajectory 330, some combination thereof, etc. Each separate vehicle 301 includes a separate ANS which can navigate the respective vehicle 301 based on the separate characterization of the object 310 which is generated at the respective vehicle 301.

As shown, each vehicle 301 can be communicatively coupled to a common communication network 340. In some embodiments, the vehicles 301A-C exchange data, including sensor data, non-solid object characterizations, etc. via the network 340. Each vehicle can augment a locally-generated characterization of the non-solid object 310 based on data received from other vehicles which are monitoring the same object. As a result, a vehicle can generate an augmented characterization of the nonsolid object 310 which may be more accurate and precise than characterizations generated based on direct monitoring of the non-solid object by sensors included in the respective vehicle alone.

In some embodiments, one or more of sensor data, nonsolid object characterizations, etc. generated at the various vehicles 301A-C can be communicated to a remote monitoring system 350 via network 340. The system 350 may communicate, to vehicles navigating through the environment 300, information regarding nonsolid objects, including objects that present an obstacle or interference, which have been detected and monitored by other vehicles in the environment 300. Communicated information can include a characterization of the nonsolid object in the environment 300. As a result, vehicles navigating through the environment 300 can be navigated in consideration of the nonsolid object 310 without directly monitoring the object via sensors included in the vehicles.

The system 350, in some embodiments, is configured to generate an updated characterization of the non-solid object, which can include one or more of a virtual solid object characterization 320 of the object 310, a predicted trajectory 330 of the object through the environment 300, a predicted growth 332 of the object 310 in the environment, some combination thereof, etc. based on one or more of characterizations, sensor data, etc. received from the vehicles 301 via network 340. The system 350 can communicate the updated characterization back to the vehicles 301 and can further communicate the characterization to one or more other vehicles which have not directly monitored the object 310 via on-board sensors.

Figure 4:
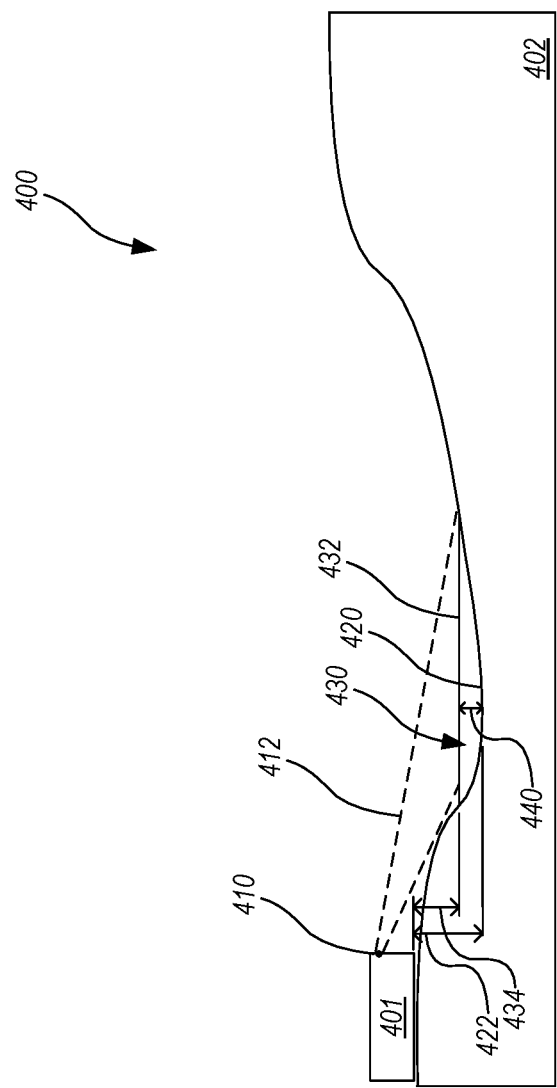
FIG. 4 illustrates a view of a vehicle navigating through an environment which includes a non-solid object comprising a pool of liquid matter, according to some embodiments.

FIG. 4 illustrates a view of a vehicle navigating through an environment which includes a non-solid object comprising a pool of liquid matter, according to some embodiments. Vehicle 401 can include any of the embodiments of vehicles included herein.

In some embodiments, a non-solid object which can be detected can include a non-solid object which is at least partially comprised of a fluid, including liquid water. Liquid water can accumulate on a roadway, under certain conditions, and can pose a obstacle to navigation along the roadway. For example, a pool of liquid water can accumulate on a portion of roadway to a depth which is sufficient to lift a vehicle off of the roadway. In another example, a mass of flowing liquid water can displace a vehicle from the roadway.

In some embodiments, a vehicle is configured to detect the presence of a non-solid object which comprises a fluid on a roadway in an external environment and can determine whether the non-solid object poses an obstacle or interference based at least in part upon a determined depth of the fluid at least meeting one or more thresholds, a flow rate of the fluid at least meeting one or more thresholds, some combination thereof, etc. The vehicle can, based on determining that the non-solid object poses an obstacle or interference, communicate information identifying the non-solid object to remote systems, navigate the vehicle in avoidance of the non-solid object etc.

In the illustrated embodiment shown in FIG. 4, an environment 400 includes a vehicle 401 which includes a sensor 410 which can monitor a terrain 402 over which the vehicle 401 is navigated. The vehicle can access one or more databases, which can be stored locally at the vehicle, accessed from a remote storage system, etc., which include characterizations of the topology of the terrain 402. As a result, the vehicle 401 can determine, based on a determined present position of the vehicle 401 on the terrain 402, a predicted elevation difference between the vehicle 401 and one or more other portions of the terrain 402. For example, as shown in the illustrated embodiment, the vehicle 401 is located on a rise in the terrain which overlooks a depression 420. Based on a stored characterization of the terrain 402 accessible by one or more portions of the vehicle 401, where the characterization can be include in a world model of the environment 400, the vehicle 401 can determine that a predicted elevation difference between the vehicle 401 and the base of the depression 420 is a particular distance 422.

Based on sensor data generated as a result of sensor 410 monitoring 412 the terrain 420, the vehicle 401 can determine that a non-solid object 430 which comprises a pool of water is located over the depression 420 in the terrain 402. In some embodiments, the determination is made at a computer system which is remote from the vehicle 401, where the vehicle 401 communicates sensor data generated by the sensor 410 to the remote system, and the remote system determines the presence of the non-solid object 430. Determination of the presence of the non-solid object 430 can be based at least in part upon sensor data generated by various sensors, including radar sensors, optical sensors, spectroscopic sensors, chemical agent sensors, etc.

As shown, based on detection and monitoring of the non-solid object 430, a depth 440 of the object 430 can be determined. In some embodiments, such determination is based on determining, based on sensor data generated by device 410 as a result of monitoring 412 the object, a relative elevation difference 434 between the vehicle 401 and a surface 432 of the non-solid object. Based on a comparison of the determined elevation difference 434 and the predicted elevation differences between the vehicle 401 and one or more portions of the terrain 402 in the depression 420, the depth 440 of the non-solid object 430 can be determined.

In some embodiments, the depth 440 is compared against a threshold depth associated with presenting an obstacle or interference to the vehicle. In response to determinations that the depth 440 of the non-solid object over the depression 420 at one or more points on the terrain exceeds the threshold depth, at least a portion of the nonsolid object 430 can be determined to present an obstacle or interference, and the vehicle 401 can be navigated along a driving route which avoids at least the non-solid object 430. In some embodiments, information associated with the object 430 can be communicated to one or more remote systems, services, etc., including a traffic control service, a public traffic information service, a weather service, a civil services service, a traffic alert service, etc. In some embodiments, the information can be communicated to proximate vehicles with which the vehicle 401 is configured to communicate information.

Figure 5:
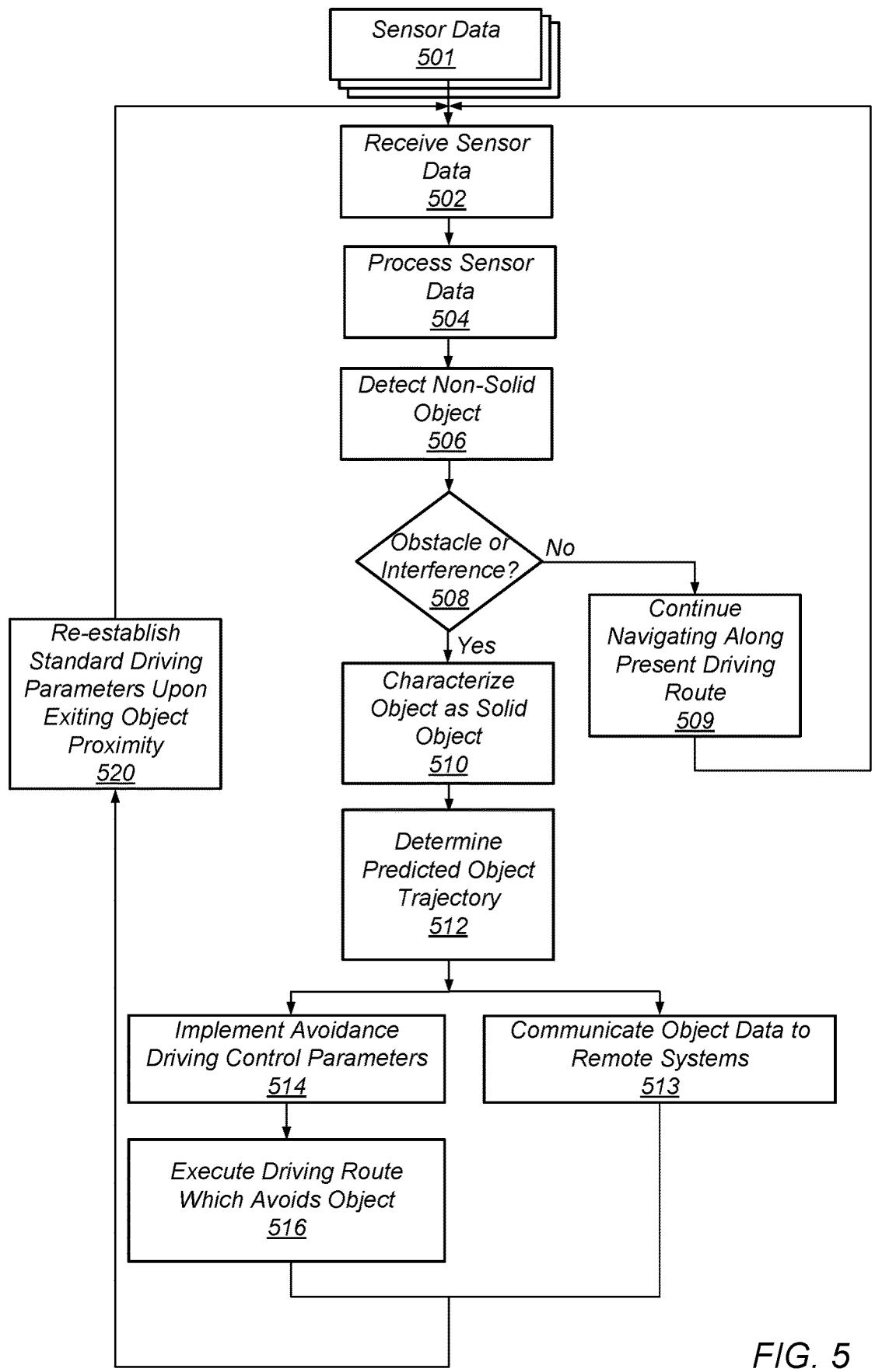
FIG. 5 illustrates autonomously navigating a vehicle through an environment based on detecting a non-solid object in the environment.

FIG. 5 illustrates autonomously navigating a vehicle through an environment based on detecting a non-solid object in the environment. The autonomous navigation can be implemented by one or more portions of any embodiment of ANS included in any embodiments herein. An ANS can be implemented by one or more computer systems.

At 502, one or more instances of sensor data 501, generated by one or more sensors included in a vehicle, are received. The one or more instances of sensor data 501 can include one or more images of one or more portions of the environment which are generated by one or more camera device. Such a camera device can include a visible light camera, an infrared camera, a near-infrared camera, etc. The one or more instances of sensor data 501 can include one or more spectroscopic images of one or more portions of the environment which are generated by one or more spectroscopic sensors. In some embodiments, sensor data 501 can include one or more instances of data generated by one or more stand-off chemical agent sensors included in the vehicle which are configured to generate data which indicates chemical substances located in one or more portions of the external environment which are physically remote from the vehicle and which are being monitored by the one or more stand-off chemical agent sensors. A stand-off chemical agent sensor, as referred to herein, can include any known device which is configured to detect one or more chemical agents in a portion of an environment which is physically remote from the portion of the environment in which the device is located.

At 504, the received sensor data is processed, which can include generating a characterization of at least a portion of the environment in which the vehicle is included. The characterization can be incorporated into an existing world model of the environment, such that the world model is updated based on the characterization. The characterization of the environment can include a characterization of solid objects, including one or more static objects, dynamic objects, some combination thereof, etc. which are located in the environment. Characterizations of solid objects in the environment can be generated based at least in part upon sensor data received from one or more sensors. For example, in some embodiments, processing sensor data at 502 includes detecting and characterizing a solid object in the environment based on identifying sensor data representations of the object in sensor data received from at least two separate sensors. For example, where the vehicle is located in an environment in which a static solid object is located, the processing at 504 can include generating a characterization of the environment which includes a characterization of the static solid object based on sensor data representations of the static solid object which are included in both an image of the object which is generated by a camera sensor and a point cloud of the object which is generated by a light beam scanning device.

At 506, a non-solid object is detected in the environment, based on the processing 504 of at least some of the sensor data received at 502. Detection of a non-solid object can be determined based on processing data from one or more sensors. For example, a non-solid object can be detected based on processing chemical agent data generated by a stand-off chemical agent detector device, where detection of the non-solid object comprises detecting a non-solid object, including a cloud, which encompasses a particular portion of the environment and is comprised of one or more particular chemical agents. In some embodiments, a non-solid object is detected based on processing sensor data generated by multiple sensors. For example, a non-solid object can be detected based on light diffraction, coloration, etc. of a portion of the environment in an image of the portion of the environment and an absence of a point cloud, radar reflect, ultrasonic reflection, etc. in a sensor data representation of the portion of the environment generated by one or more of a light beam scanning device, radar, ultrasonic sensor, some combination thereof, etc. As a result, an image which indicates a presence of an object in the environment, when processed in combination with sensor data generated by other object which indicate an absence of any object in the environment which includes reflective surfaces, can be used to determine the presence of a non-solid object in the environment.

A non-solid object can be detected independently of detecting an object which is relatively more opaque than the surrounding environment. For example, some non-solid objects can comprise a cloud of optically transparent gases, and the cloud can be detected based on processing one or more of chemical agent detection data, spectroscopic data, etc. generated by one or more various sensors. In addition, an optically transparent non-solid object can be detected based at least in part upon a coloration of the agents comprising the object, a refraction of light passing through the object, some combination thereof, etc.

At 508, a determination is made whether the non-solid object presents an obstacle or interference. Such a determination can be made based on a determination of the chemical composition of the non-solid object. For example, where the detection of a non-solid object at 506 comprises determining, based on processing one or more instances of sensor data generated by one or more sensors included in the vehicle, that the non-solid object is comprised of a substance which is associated with a concern, the non-solid object may be determined to be an obstacle or interference. A substance which is associated with a concern can include one or more substances which can pose a concern to occupants of the vehicle, including chlorine, ammonia, smoke, etc., or one or more substances that may interfere with operation of the vehicle. A substance which is associated with a concern may include one or more substances which can pose an obstacle or interference to operation of the vehicle, including a cloud comprising gasoline, a pool of standing water, etc. A determination of whether a non-solid object is an obstacle or interference may be based on a determined size, density, etc. of the object. For example, a cloud comprising nitrogen may be determined to be an obstacle or interference based on a determination that the density of nitrogen in the cloud exceeds a certain threshold level, a determination that the volume of the cloud exceeds a certain threshold, etc.

If no non-solid objects presenting an obstacle or interference are detected in the environment, at 509, the vehicle is continued to be navigated along the driving route which the vehicle is presently being navigated. A solid object that does not present an obstacle or interference, for example, may include a pool comprising moving water which is smaller than a certain threshold level and includes water flowing at less than a threshold rate, and the vehicle may be navigated along the present driving route, even if such navigation results in the vehicle passing through at least a portion of the pool. In some embodiments, navigating the vehicle along the present driving route may include the vehicle interior being at least partially isolated from the environment while the vehicle is within a certain proximity to the non-solid object. For example, where the non-solid object comprises a cloud which comprises a concentration of hydrogen sulfide which is less than a threshold concentration associated with an obstacle or interference to vehicle operation, continuing to navigate the vehicle at 509 may include closing open portals between the vehicle cabin and the external environment while the vehicle is within a certain physical proximity to the cloud.

At 510, based on a determination that a non-solid object is a presents an obstacle or interference, a characterization of the object is generated and incorporated into the world model, where the characterization comprises an object which encompasses the portion of the environment encompassed by the non-solid object and may further be characterized as a solid object. As a result, where a driving route is developed which navigates the vehicle through an environment without intersecting with solid objects, the developed route may avoid the non-solid object as if the object were a solid object to be avoided. Therefore, a driving route through an environment which includes a non-solid object presenting an obstacle or interference will avoid intersecting the non-solid object.

At 512, a trajectory of the non-solid object is determined. The determination can be based on sensor data regarding present location, motion, growth, etc. of the non-solid object in the environment. The determination can be based on local weather data, including weather data generated by a sensor included in the vehicle, weather data received from a remote weather system via a communication network link, etc.

At 513, data associated with the detected object is communicated to one or more remotely located systems, vehicles, etc. The communicated data can include data indicating one or more of a present location, velocity, predicted trajectory, composition, etc. associated with the non-solid object.

At 514, a set of avoidance driving parameters are implemented, such that the vehicle is navigated according to the avoidance parameters instead of standard driving parameters. Avoidance driving parameters can include navigating the vehicle in a roadway lane in a direction which is different from the direction of travel associated with the lane, exceeding a speed limit associated with the roadway, accelerating the vehicle at a rate which is greater than a maximum rate associated with standard driving parameters, turning the vehicle at a rate which is greater than a maximum rate associated with standard driving parameters, etc. Such driving parameter implementation can be associated with physical proximity to the non-solid object, such that the vehicle is navigated according to the avoidance driving parameters when the vehicle is located within a certain physical proximity to the non-solid object and the driving parameters implemented are switched to standard driving parameters when the vehicle is located greater than the certain physical proximity, also referred to as a certain proximity distance, from the non-solid object. A determination of whether the vehicle is located more or less than a certain proximity distance from a non-solid object may be included in a determination of whether the vehicle is located inside or outside of a proximity region associated with the non-solid object, as the proximity distance can comprise a distance from an outer boundary of a non-solid object to an outer boundary of a proximity region associated with the non-solid object.

At 516, a driving route which navigates the vehicle in avoidance of the non-solid object is developed and executed. The driving route can prioritize object avoidance over travel time, distance, etc. to a destination. As a result, the driving route can include stopping the vehicle, turning the vehicle around to backtrack along a previously-navigated roadway, etc. At 520, based on a determination that the vehicle is greater than a certain physical proximity from the non-solid mass, the standard driving parameters are re-established, and the vehicle is navigated according to the standard driving parameters instead of the avoidance driving parameters.

Figure 6:
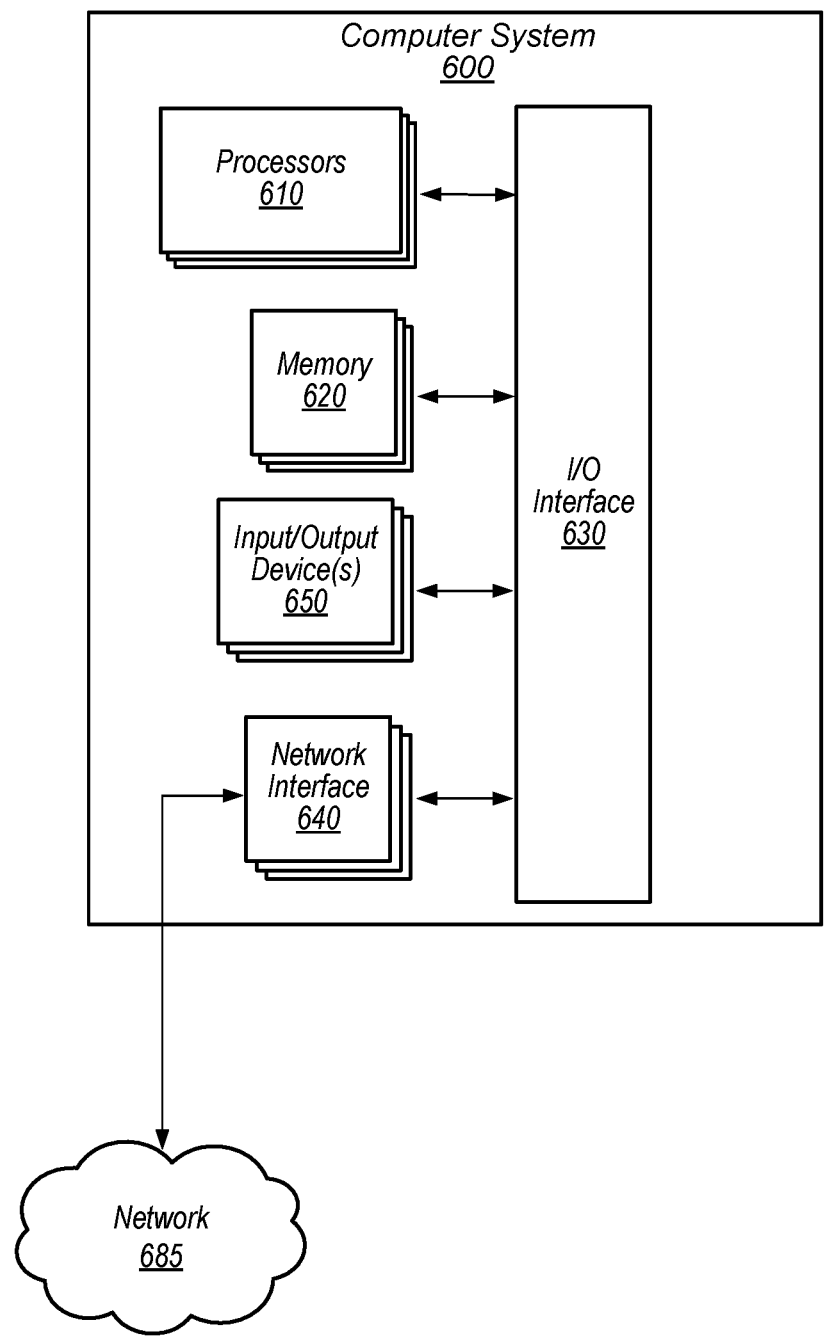
FIG. 6 illustrates an example computer system configured to implement aspects of a system and method for autonomous navigation, according to some embodiments.

FIG. 6 illustrates an example computer system 600 that may be configured to include or execute any or all of the embodiments described above. In different embodiments, computer system 600 may be any of various types of devices, including, but not limited to, a personal computer system, desktop computer, laptop, notebook, tablet, slate, pad, or netbook computer, cell phone, smartphone, PDA, portable media device, mainframe computer system, handheld computer, workstation, network computer, a camera or video camera, a set top box, a mobile device, a consumer device, video game console, handheld video game device, application server, storage device, a television, a video recording device, a peripheral device such as a switch, modem, router, or in general any type of computing or electronic device.

Various embodiments of an autonomous navigation system (ANS), as described herein, may be executed in one or more computer systems 600, which may interact with various other devices. Note that any component, action, or functionality described above with respect to FIGS. 1 through 5 may be implemented on one or more computers configured as computer system 600 of FIG. 6, according to various embodiments. In the illustrated embodiment, computer system 600 includes one or more processors 610 coupled to a system memory 620 via an input/output (I/O) interface 630. Computer system 600 further includes a network interface 640 coupled to I/O interface 630, and one or more input/output devices, which can include one or more user interface (also referred to as "input interface") devices. In some cases, it is contemplated that embodiments may be implemented using a single instance of computer system 600, while in other embodiments multiple such systems, or multiple nodes making up computer system 600, may be configured to host different portions or instances of embodiments. For example, in one embodiment some elements may be implemented via one or more nodes of computer system 600 that are distinct from those nodes implementing other elements.

In various embodiments, computer system 600 may be a uniprocessor system including one processor 610, or a multiprocessor system including several processors 610 (e.g., two, four, eight, or another suitable number). Processors 610 may be any suitable processor capable of executing instructions. For example, in various embodiments processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

System memory 620 may be configured to store program instructions, data, etc. accessible by processor 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions included in memory 620 may be configured to implement some or all of an ANS, incorporating any of the functionality described above. Additionally, existing automotive component control data of memory 620 may include any of the information or data structures described above. In some embodiments, program instructions and/or data may be received, sent or stored upon different types of computer-accessible media or on similar media separate from system memory 620 or computer system 600. While computer system 600 is described as implementing the functionality of functional blocks of previous Figures, any of the functionality described herein may be implemented via such a computer system.

In one embodiment, I/O interface 630 may be configured to coordinate I/O traffic between processor 610, system memory 620, and any peripheral devices in the device, including network interface 640 or other peripheral interfaces, such as input/output devices 650. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computer system 600 and other devices attached to a network 685 (e.g., carrier or agent devices) or between nodes of computer system 600. Network 685 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices may, in some embodiments, include one or more display terminals, keyboards, keypads, touchpads, scanning devices, voice or optical recognition devices, or any other devices suitable for entering or accessing data by one or more computer systems 600. Multiple input/output devices may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

Memory 620 may include program instructions, which may be processor-executable to implement any element or action described above. In one embodiment, the program instructions may implement the methods described above. In other embodiments, different elements and data may be included. Note that data may include any data or information described above.

Those skilled in the art will appreciate that computer system 600 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. An apparatus, comprising:
   an autonomous navigation system configured to be installed in a vehicle and autonomously navigate the vehicle through an environment in which the vehicle is located, wherein the autonomous navigation system is configured to:
   detect a non-solid object comprising a gaseous substance in the environment, based on processing sensor data generated by one or more sensors configured to monitor the environment to detect one or more features of the non-solid object comprising at least one non-visible feature of the gaseous substance that is detectable at one or more of an infrared light wavelength, a near-infrared light wavelength, or an ultraviolet light wavelength;
   determine that the non-solid object presents an obstacle or interference to operation of the vehicle based on a determination of whether a density of the non-solid object exceeds a threshold level, wherein the density is determined according to an analysis of the sensor data; and
   based on the determination that the non-solid object presents the obstacle or interference, navigate the vehicle along a driving route which avoids intersecting with the non-solid object.

2. The apparatus of claim 1, wherein
   a spectroscopic sensor configured to detect the non-solid object based at least in part upon spectroscopic monitoring of the non-solid object.

3. The apparatus of claim 1, wherein:
   to detect the non-solid object in the environment, the autonomous navigation system is configured to:
   detect the gaseous substance in the environment, based on processing the sensor data generated by one or more sensors, wherein the non-solid object is determined to be an obstacle based at least in part upon the non-solid object comprising the gaseous substance.

4. The apparatus of claim 1, wherein the one or more features of the non-solid object further comprises one or more visible features, and wherein to detect the non-solid object, the one or more sensors are further configured to detect one or more visible features of the non-solid object.

5. The apparatus of claim 1, wherein:
   to navigate the vehicle along the driving route which avoids intersecting the non-solid object, the autonomous navigation system is configured to:
   incorporate, into a virtual representation of the environment, a virtual representation of the non-solid object which characterizes the non-solid object as a solid object in the virtual representation of the environment; and
   navigate the vehicle along a driving route which avoids intersecting solid object representations incorporated into the virtual representation of the environment.

6. The apparatus of claim 1, wherein:
   to detect the non-solid object in the environment, the autonomous navigation system is configured to:

determine a predicted trajectory of the non-solid object through the environment according to an analysis of the sensor data; and to navigate the vehicle along the driving route which avoids intersecting the non-solid object, the autonomous navigation system is configured to:

navigate the vehicle along a driving route which avoids intersecting the non-solid object at any point along the predicted trajectory of the non-solid object.

7. The apparatus of claim 1, wherein:

to detect the non-solid object in the environment, the autonomous navigation system is configured to associate a proximity region with the non-solid object, wherein the proximity region extends at least a certain proximity distance from the non-solid object;

to navigate the vehicle along a driving route which avoids intersecting the non-solid object, the autonomous navigation system is configured to navigate the vehicle along a driving route which avoids intersecting the proximity region; and the autonomous navigation system is configured to selectively engage a set of avoidance driving parameters, such that the vehicle is selectively navigated according to the set of avoidance driving parameters, based on a determination that the vehicle is presently located within the proximity region.

8. A method, comprising:

performing, by one or more computer systems:

autonomously navigating a vehicle through an environment in which the vehicle is located, wherein the autonomously navigating comprises:

detecting a non-solid object comprising a gaseous substance in the environment, based on processing sensor data generated by one or more sensors configured to the environment to detect one or more features of the non-solid object comprising at least one non-visible feature of the gaseous substance that is detectable at one or more of an infrared light wavelength, a near-infrared light wavelength, or an ultraviolet light wavelength;

determine that the non-solid object presents an obstacle or interference to operation of the vehicle based on a determination of whether a density of the non-solid object exceeds a threshold level, wherein the density is determined according to an analysis of the sensor data; and based on the determination that the non-solid object presents an obstacle or interference, navigating the vehicle along a driving route which avoids intersecting the non-solid object.

9. The method of claim 8, wherein the one or more sensors comprises:

a spectroscopic sensor configured to detect the non-solid object based at least in part upon spectroscopic monitoring of the non-solid object.

10. The method of claim 8, wherein:

detecting the non-solid object in the environment comprises:

detecting the gaseous substance in the environment, based on processing the sensor data generated by one or more sensors, wherein determining that the non-solid object presents an obstacle or interference is further based at least in part upon the non-solid object comprising the gaseous substance.

11. The method of claim 8, wherein the one or more features of the non-solid object further comprises one or more visible features, and wherein to detect the non-solid object, the one or more sensors are further configured to detect one or more visible features of the non-solid object.

12. The method of claim 8, wherein:

navigating the vehicle along the driving route which avoids intersecting the non-solid object comprises:

incorporating, into a virtual representation of the environment, a virtual representation of the non-solid object which characterizes the non-solid object as a solid object in the virtual representation of the environment; and navigating the vehicle along a driving route which avoids intersecting solid object representations incorporated into the virtual representation of the environment.

13. The method of claim 8, wherein:

detecting the non-solid object in the environment comprises:

determining a predicted trajectory of the non-solid object through the environment according to an analysis of the sensor data; and navigating the vehicle along the driving route which avoids intersecting the non-solid object comprises:

navigating the vehicle along a driving route which avoids intersecting the non-solid object at any point along the predicted trajectory of the non-solid object.

14. The method of claim 8, wherein:

detecting a non-solid object in the environment comprises associating a proximity region with the non-solid object, wherein the proximity region extends at least a certain proximity distance from the non-solid object;

navigating the vehicle along a driving route which avoids intersecting the non-solid object comprises navigating the vehicle along a driving route which avoids intersecting the proximity region; and the method comprises selectively engaging a set of avoidance driving parameters, and selectively navigating the vehicle according to the set of avoidance driving parameters, based on a determination that the vehicle is presently located within the proximity region.

15. A non-transitory, computer-readable medium storing a program of instructions which, when executed by at least one computer system, cause the at least one computer system to:

autonomously navigate a vehicle through an environment in which the vehicle is located, wherein the autonomously navigating comprises:

detecting a non-solid object comprising a gaseous substance in the environment, based on processing sensor data generated by one or more sensors configured to monitor the environment to detect one or more features of the non-solid object comprising at least one non-visible feature of the gaseous substance that is detectable at one or more of an infrared light wavelength, a near-infrared light wavelength, or an ultraviolet light wavelength;

determining that the non-solid object presents an obstacle or interference to operation of the vehicle based on a determination of whether a density of the non-solid object exceeds a threshold level, wherein the density is determined according to an analysis of the at least one non-visible feature; and based on the determination that the non-solid object presents an obstacle or interference, navigating the vehicle along a driving route which avoids intersecting the non-solid object.

16. The non-transitory, computer-readable medium of claim 15, wherein the one or more sensors comprises:

a stand-off chemical agent sensor configured to detect the non-solid object based at least in part upon detecting at least one chemical substance comprising the non-solid object.

17. The non-transitory, computer-readable medium of claim 15, wherein:
   detecting the non-solid object in the environment comprises:
      detecting the gaseous substance comprising the non-solid object in the environment, based on processing the sensor data generated by one or more sensors, wherein determining that the non-solid object presents an obstacle or interference based at least in part upon the non-solid object comprising the gaseous substance.

18. The non-transitory, computer-readable medium of claim 15, wherein the one or more features of the non-solid object further comprises one or more visible features, and wherein to detect the non-solid object, the one or more sensors are further configured to detect one or more visible features of the non-solid object.

19. The non-transitory, computer-readable medium of claim 15, wherein:
   navigating the vehicle along the driving route which avoids intersecting the non-solid object comprises:
      incorporating, into a virtual representation of the environment, a virtual representation of the non-solid object which characterizes the non-solid object as a solid object the virtual representation of in the environment; and
      navigating the vehicle along a driving route which avoids intersecting solid object representations incorporated into the virtual representation of the environment.

20. The non-transitory, computer-readable medium of claim 15, wherein:
   detecting the non-solid object in the environment comprises:
      determining a predicted trajectory of the non-solid object through the environment; and
   navigating the vehicle along the driving route which avoids intersecting the non-solid object comprises:
      navigating the vehicle along a driving route which avoids intersecting the non-solid object at any point along the predicted trajectory of the non-solid object.

* * * * *